(12) United States Patent
Likovich, Jr. et al.

(10) Patent No.: US 6,643,257 B1
(45) Date of Patent: Nov. 4, 2003

(54) VERIFYING PERFORMANCE OF A BUFFERING AND SELECTION NETWORK DEVICE

(75) Inventors: Robert Brian Likovich, Jr., Raleigh, NC (US); Darryl Jonathan Rumph, Cary, NC (US); Chad Everett Winemiller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,244

(22) Filed: Jan. 4, 2000

(51) Int. Cl.$^7$ ............................................... G01R 31/08
(52) U.S. Cl. ....................... 370/229; 370/428; 370/468; 710/52; 714/724; 714/733
(58) Field of Search ................................. 370/229, 236, 370/428, 429, 412, 468; 710/52; 714/724, 733

(56) References Cited

U.S. PATENT DOCUMENTS

| | | | | |
|---|---|---|---|---|
| 4,638,475 A | 1/1987 | Koike | ......................... | 370/422 |
| 5,224,092 A | 6/1993 | Brandt | ........................ | 370/232 |
| 5,280,469 A | 1/1994 | Taniguchi et al. | ........... | 370/250 |
| 5,351,232 A | 9/1994 | Yamashita | ................... | 370/248 |
| 5,504,754 A | 4/1996 | Grunenfelder | ............... | 714/712 |
| 5,768,259 A | 6/1998 | Stock et al. | ............. | 370/235.1 |
| 5,790,542 A | 8/1998 | Kim et al. | ................... | 370/392 |
| 5,940,377 A | 8/1999 | Sakaue et al. | ............... | 370/253 |

FOREIGN PATENT DOCUMENTS

| | | | | |
|---|---|---|---|---|
| JP | 05-083291 | 4/1993 | ........... | H04L/12/48 |
| JP | 09-289516 | 11/1997 | ........... | H04L/12/28 |
| JP | 10-093562 | 4/1998 | ........... | H04L/12/26 |
| JP | 10-190665 | 7/1998 | ........... | H04L/12/28 |
| WO | WO98/27697 | 12/2000 | ........... | H04L/12/56 |

Primary Examiner—Ajit Patel
Assistant Examiner—Steven A Blount
(74) Attorney, Agent, or Firm—Driggs, Lucas, Brubaker & Hogg

(57) ABSTRACT

A method of and program for dynamically testing a buffering and selection device, wherein the buffering and selection device receives a transmission at an average bandwidth of T and in peak bandwidth bursts that may be greater than T, are provided. The buffering and selection device transmits data to one or more receive devices, all of which have a total average bandwidth of at least T. The buffering and selection device has buffers apportioned to each receive device in order to store data that is written in burst mode destined for that receive device. The method includes disabling the output data flow to the receive device being tested and then generating input data to the buffering and selection device tagged for each receive device in burst mode at a preselected number of transfers for each receive device. The program determines when the preselected number of transfers has occurred and then enables data flow to the receive device being tested. It is then determined if output to each receive device has commenced within a preselected latency period, and, if it has, it is determined if the preselected number of transfers of data has occurred within a preselected transfer period, i.e., meets bandwidth requirements.

10 Claims, 4 Drawing Sheets

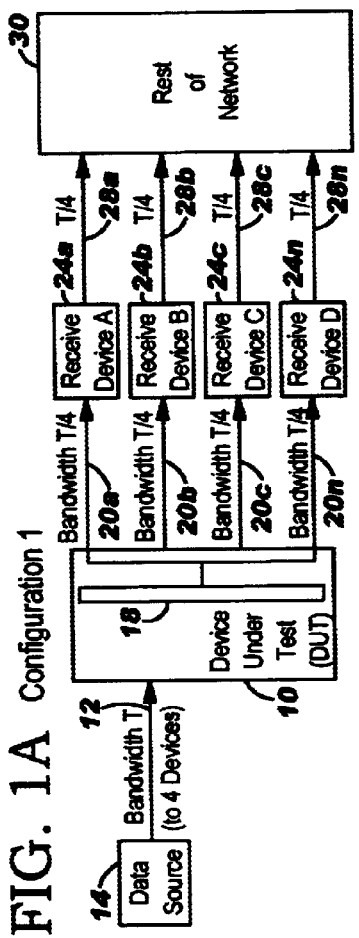
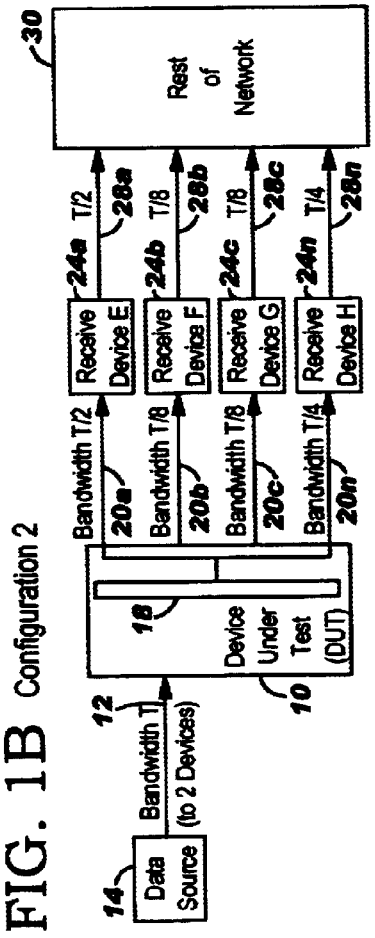
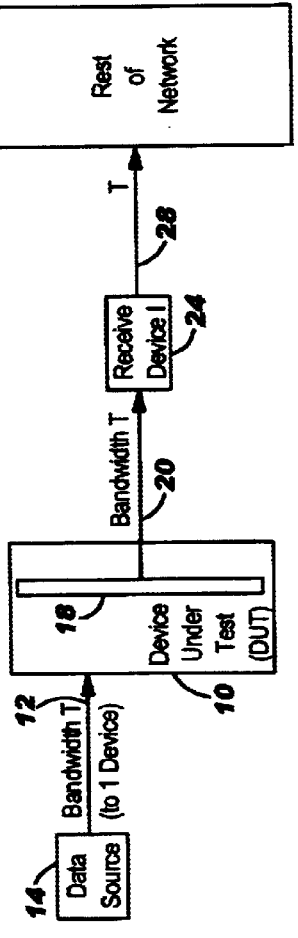
FIG. 1A Configuration 1
FIG. 1B Configuration 2
FIG. 1C Configuration 3

VERIFYING PERFORMANCE OF A BUFFERING AND SELECTION NETWORK DEVICE

BACKGROUND OF THE INVENTION

A common problem with network systems, such as Ethernet systems, is ensuring that a system can provide adequate bandwidth to one or more destinations from a single input data source. A device which buffers the input data and selects which destination receives this data is often required to work in different network configurations, each with its own bandwidth necessities. In some systems, it is not predetermined 1) which destination will require a given bandwidth, 2) when the bandwidth will be required, and 3) how much bandwidth will be required when requested. As used herein, the term bandwidth is intended to mean the average bandwidth over a period of time. For example, a typical bandwidth with certain networks is 3 gigabits per second. However, during peak times during transmission, the bandwidth may exceed the average for a short period of time. The activity during these intervals of time will be referred to as "peak bandwidth" or "bursts".

FIGS. 1a, 1b and 1c depict three possible network system configurations, each with a different number of receive devices and each having possibly different bandwidth capabilities. In this system, a buffering and selection device 10 is provided which receives data 12 of a given average bandwidth T from a data source 14. The buffering and selection device 10 includes selection logic 18, which provides data to output busses 20a–20n. The output busses 20a–20n provide data to each receive device, four of which are shown in FIGS. 1a and 1b designated as 24a, 24b, 24c and 24n and one of which is shown in FIG. 1c and designated as 24. Receive devices 24a, 24b, 24c and 24n each transmits data on data lines 28a, 28b, 28c and 28n to a network of users 30. Typically, the average output bandwidths of the receive devices 24a, 24b, 24c and 24n are a fraction of the average bandwidth of the input data 12 on the data source 14, except in the case where there is only one receive device 24, as shown in FIG. 1c wherein the receive device has an average bandwidth equal to that of the input data. Preferably, the total average bandwidth output of all of the receive devices 24a–24n in each of the configurations of FIGS. 1a, 1b and 1c is equal to the total average bandwidth of the data 12 from the data source. In any event, data 12 from the data source 14 cannot have a greater average bandwidth than the total average bandwidth of the receive devices, although it may have a lesser average bandwidth.

In operation, the buffering and selection device operates to receive data of an average bandwidth T from a data source, buffer the data when necessary, and transmit the data to one of the receive devices 24a, 24b, 24c or 24n under control of the selection logic 18 in the buffering and selection device. Each of the receive devices 24a–24n has a limited amount of storage capacity, such that it may receive at peak bandwidths greater than its average output bandwidth for a limited period of time. However, during peak bandwidth transmissions or bursts, any one of the receive devices 24a–24n may not be able to transmit data as fast as it is receiving data, and the data may have to be buffered in the device 10. During operation, real time events in the system may require that any one of the receive devices 24a–24n has to temporarily stop the flow of traffic from the buffering and selection device 10. Even though the buffering and selection device 10 only sends data to one of the receive devices 24a, 24b, 24c or 24n individually at a given time and not to two or more in parallel, it must maintain the required average bandwidth T. In such a case, the incoming data may have to be buffered in the device 10 until the receive devices 24a–24n are ready to receive. With the buffering and selection device being used with many possible system setups, it is important that the buffering and selection device be able to provide "bandwidth on demand" to the receive devices in many different configurations. Thus, it is necessary to test the buffering and selection device not only in a static test, i.e. by providing input data to the device at a fixed rate of the average bandwidth input with an output also at the fixed rate of the average bandwidth output, but also in a dynamic configuration wherein all of the input and output rates to and from the buffering and selection device are changed depending upon the demands of receive devices.

SUMMARY OF THE INVENTION

The present invention relates to a method of and program for dynamically testing a buffering and selection device wherein the buffering and selection device receives a transmission at an average bandwidth of T and in peak bandwidth bursts that may be greater than T. The buffering and selection device transmits data to one or more receive devices, all of which have a total average bandwidth of at least T. The buffering and selection device has buffers apportioned to each receive device in order to store data that is written in burst mode destined for that receive device. The method includes disabling the output data flow to the receive device being tested and then generating input data to the buffering and selection device tagged for each receive device in burst mode at a preselected number of transfers for each receive device. The program determines when the preselected number of transfers has occurred and then enables data flow to the receive device being tested. It is then determined if output to each receive device has commenced within a preselected latency period, and, if it has, it is determined if the preselected number of transfers of data has occurred within a preselected transfer period, i.e., meets bandwidth requirements.

DESCRIPTION OF THE DRAWINGS

FIGS. 1a, 1b, and 1c are diagrammatic representations of the operation of a buffering and selection device according to this invention to receive data at an average bandwidth T and to output data to receive devices;

DESCRIPTION OF THE PREFERRED EMBODIMENTS

Figure 2:
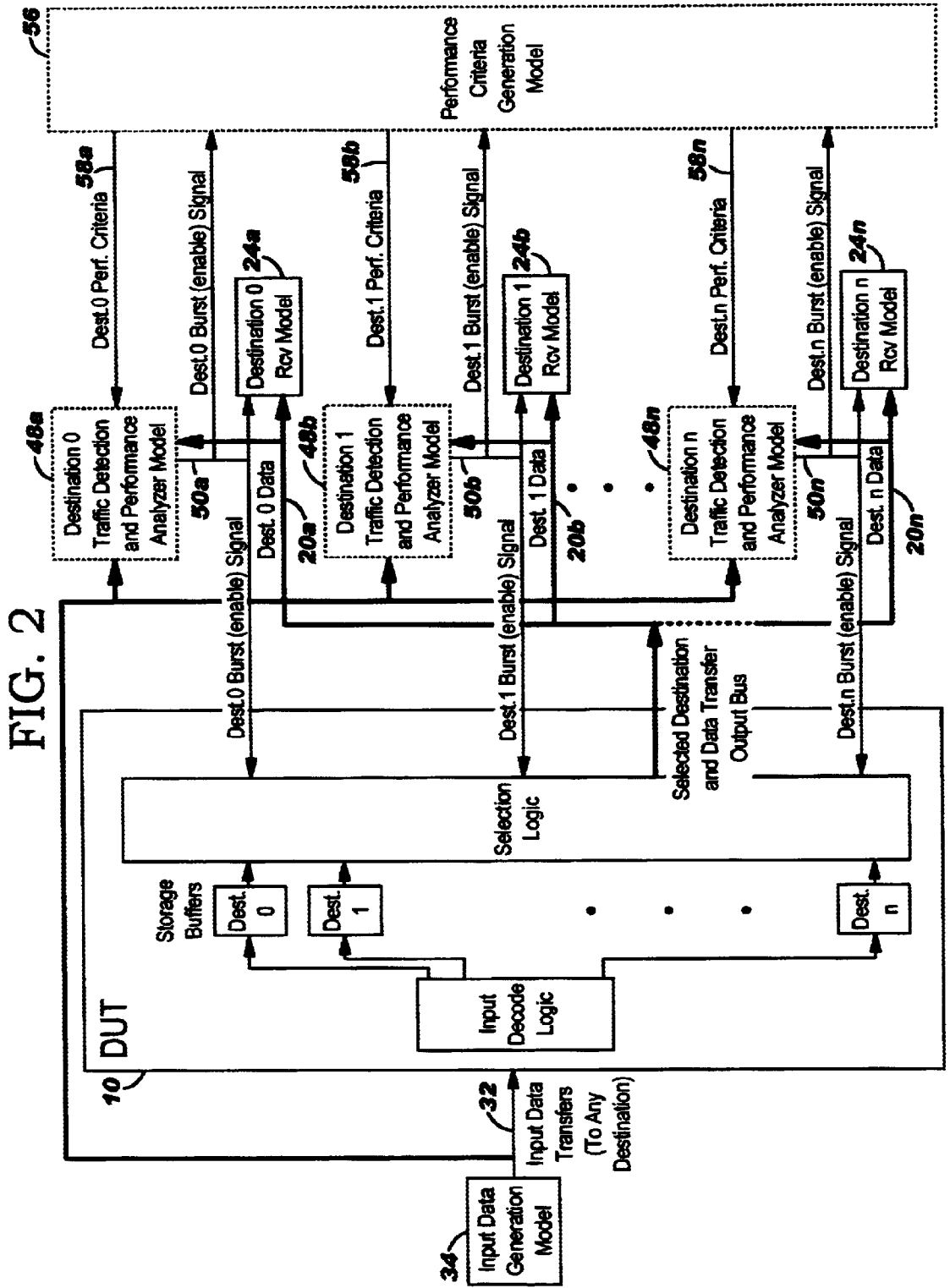
FIG. 2 is a block diagram depicting the operation of testing of the buffering and selection device according to the present invention.

FIG. 2 depicts a diagrammatic representation of the testing of the buffering and selection device 10 shown in FIGS. 1a–1c. Test data input 32 from an input data generation model 34 is provided to the device 10. The model 34 is controlled to provide data to the buffering and selection device 10 for test purposes at the average data transfer rate or bandwidth T. As described above, the peak transfer rates or peak bandwidths for very short periods of time may exceed the average transfer rate or bandwidth T. The input data generation model 34 is configured to generate the test data input 32 at the average data rate or bandwidth T of the design of the system. The data 32 is transmitted to input decode logic 36 in the buffering and selection device 10, the outputs of which are provided to FIFO storage buffers 38a–38n as outputs 40a–40n from the decode logic 36. The number of outputs 40a–40n is equal to the number of receive devices 24a–24n that are to be used for the particular buffering and selection device 10. In FIGS. 1a and 1b there are four receive devices, and in FIG. 1c there is only one receive device. As indicated earlier, the average bandwidths of each of the receive devices 24a–24n (except in the case of FIG. 1c) are equal to a fraction of the average bandwidth of the input test data 32, with the total average bandwidth of all of the receive devices 24a–24n and, hence, the total of the outputs 40a–40n, being equal to or greater than the total average bandwidth T of the input data 32. The storage buffers 38a–38n are preferably configured as a storage buffer system and can be apportioned to be proportional to the average bandwidth of each of the outputs 40a–40n, i.e. if the output of 40a is twice the average bandwidth of 40b, then the size of the buffer for 40a is twice that of 40b, and if the average bandwidth of the output 40b is equal to the output of the average bandwidth 40n, then the size of the buffer 38n is equal to the size of the buffer 38b. The buffers 38a–38n perform two distinct functions. First, if the peak bandwidth transmission of any receive device 24a–24n exceeds the capacity of the buffering and selection device to transmit the data, the excess data is stored in the respective buffer 38a–38n. Second, if for some reason, a particular receive device 24a–24n cannot access the network 30 for a period of time, the data for that device 24a–24n is stored in its associated buffer 38a–38n.

The buffers 38a–38n from the buffer system 38 output data 42a–42n to the selection logic 18. As indicated above, the selection logic selects the data from the proper buffer 38a–38n of the buffer system 38 to be delivered to the corresponding receive device 24a–24n. The selection logic also guides the data to destination traffic detector and performance analyzers, hereinafter analyzers, 48a–48n as well as to the receive devices 24a–24n. Performance criteria for the testing is provided by a performance criteria generation model 56 which provides the performance criteria 58a–58n to the analyzers 48a–48n to perform the tests on the buffering and selection device 10. The test data 32 is also provided to each of the analyzers 48a–48n.

The testing of the buffering and selection device 10 is performed as follows. The input data generation model 34 is programmed to input data 32 into the buffering and selection device 10 at the average bandwidth over a period or periods of time under test. The test is performed on the buffering and selection device for the flow of data to each receive device 24a–24n at the peak bandwidth for each device during each burst. The input data generation model 34 generates the data 32 at the desired average bandwidth. The data plus the tag for its destination is transmitted to the input decode logic 36 of the buffering and selection device 10 and is also transmitted to each of the analyzers 48a–48n. The decode logic 36 determines which of the buffers 38a–38n is to receive the data 32 based on the destination tag of the data 32. The performance criteria generation model 56 is also programmed with the peak bandwidths of the busses 20a–20n to each receive device 24a–24n. The performance criteria generation model 56 provides performance criteria 58a–58n to each of the analyzers 48a–48n. The destination analyzers 48a–48n also provide a burst signal 50a–50n to the selection logic 18 and to each of the receive devices 24a–24n to enable the flow of data between the selection logic 18 and the receive devices 24a–24n. The analyzers 48a–48n also send the burst signal 50a–50n to the performance criteria generation model 56 such that the performance criteria generation model 56 can calculate new performance criteria for each burst.

In operation, the test data 32 from the data generation model 34 is provided to the input decode logic in a preselected sequence of destinations for the various receive devices 24a–24n The test data 32 is stored in the appropriate storage buffer 38a–38n depending upon its tagged receive device 24a–24n. The analyzers 48a–48n monitor the test data 32 from the data generation model 34 and count the number of data transfers that are being directed to each of the receive devices 24a–24n. The analyzers 48a–48n then decide based on a given burst size when to enable the burst signals 50a–50n to be sent to the selection logic 18, the receive devices 24a–24n, and the performance criteria generation model 56. These burst signals enable the output data to be transmitted from the storage buffers 38a–38n, through the selection logic 18, and to the receive devices 24a–24n. The burst signals also enable the performance criteria generation model 56 to calculate new performance criteria 58a–58n. The analyzers 48a–48n then measure the peak data rate as compared to the respective performance criteria 58a–58n for each receive device 24a–24n after a specified latency period. The latency period is given to allow some amount of delay for the selection logic 18 to respond to the burst signals 50a–50n.

As the data 32 is transmitted and the various data buffers 38a–38n are individually emptied, each of the analyzers 48a–48n keeps track of the amount of data stored in each of its associated buffers 38a–38n. This allows the detection and flagging of any "traffic jam" which causes any particular buffer 38a–38n to exceed its maximum amount of data stored which, in turn, can indicate whether the buffering and selection device needs to be redesigned or modified. Thus, it is possible to stress the buffering and selection device 10 in many different ways under many different conditions to determine if it can meet performance characteristics in a dynamic fashion rather than just statically. To this end, it is to be understood that the testing can be done not only on a physical device on a chip, but also can be done as a simulation model. In this case, a very early indication of design problems can be detected and overcome before the actual building of devices takes place. To this end, where the terms "devices" and "structure" are used, they are to be understood to refer to simulations of these structures as well as the actual structures themselves.

Figure 3:
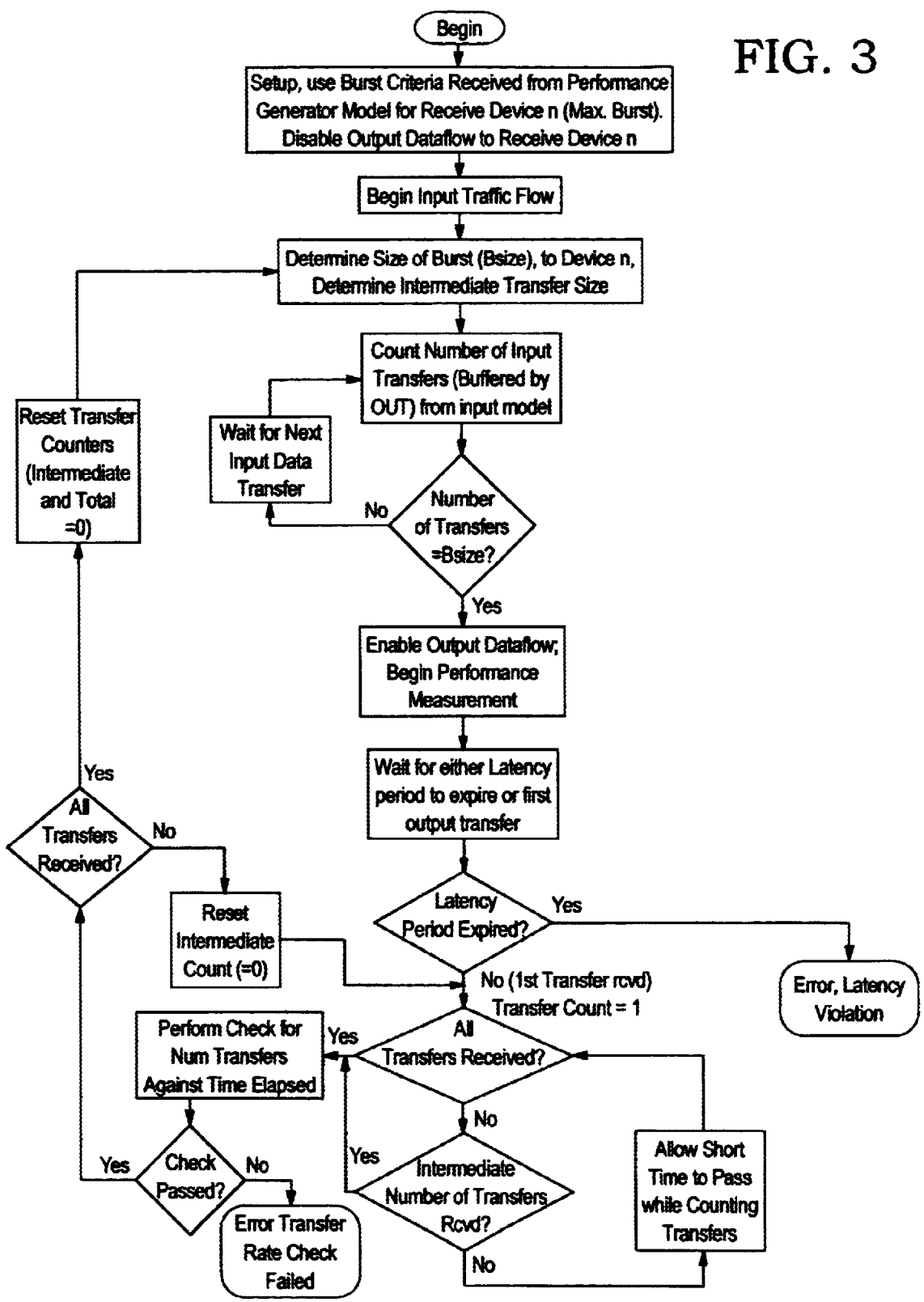
FIG. 3 is a flow chart of the test protocol of the present invention.

FIG. 3 is a flow chart depicting the protocol for testing the buffering and selection device 10, referred to in the flow chart as the DUT (device under test). During the setup, the burst criteria, i.e. the peak transfer rate or bandwidth, is received from the performance generator model for the particular receive device 24a–24n to be tested, and the output of the data to this receive device 24a–24n is disabled. The input data flow 12 is then started. The burst size, i.e. how many transfers of the output bus 20 are in a burst, will be used. The number of transfers is counted and continued to be received until the burst size as previously determined has been reached. At this point, the output data flow is enabled. The test waits for the latency period, i.e. the predetermined period of time in which the first output transfer of data should occur, to expire or a first transfer of data to occur, whichever is first. If the latency period expires before the first output transfer of data occurs, then the test flags an error as a latency violation. If the first transfer of data occurs before the latency period expires, the number of output data transfers are counted, and a check is performed to see if the selected number of data transfers has occurred in the allotted time. If this number is not reached, there is an error indicated. If the number of transfers is sufficient in the allotted time, the test is passed and parameters reset for the next device 24a–24n to be tested. Note that all of the receive devices 24a–24n can be tested in this fashion in parallel, and the testing is not limited to testing a single receive device 24a–24n at a time.

Figure 4:
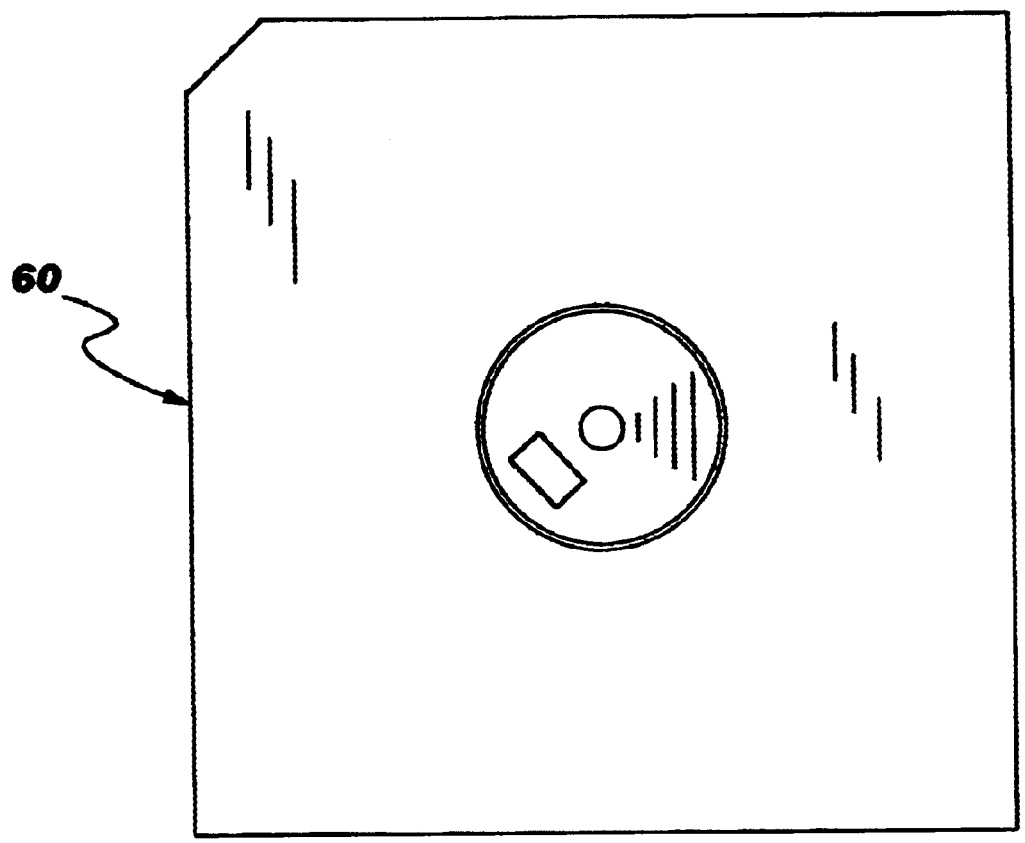
FIG. 4 is a plan view of a computer floppy disc on which the program to perform the method of the present invention can reside.

A program to perform the method of testing described above can reside on a computer floppy disc 60 as shown in FIG. 4, or on other media.

Accordingly, the preferred embodiment(s) of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method of dynamically testing a buffering and selection device which is configured to receive data including destination tags at a given average bandwidth T, and in a peak bandwidth greater than T as bursts, and store and output data to at least one receive device, the total average bandwidth that the receive devices can transmit data being at least as great as T, and wherein said buffering and selection device includes a buffering system apportioned to each receiving device proportional to the portion of the total average bandwidth of each of said receiving devices to the total average bandwidth of all of the receiving devices, and selection logic to store in and read from said buffering system data written to each specific receive device individually, in burst mode, said method comprising the steps of:
   a. disabling the output data flow to the receive device being tested;
   b. generating input data to said buffering and selection device tagged for each receive device successively in burst mode and at a preselected number of transfers for each receive device;
   c. determining when such preselected number of transfers of data has occurred to the receive device being tested;
   d. enabling data flow to the receive device being tested,
   e. determining if the output from each receive device has commenced within a preselected latency period;
   f. if the output from a given device has commenced within the said preselected latency period, determining if the preselected number of transfers of the data has occurred within a preselected transfer period; and
   g. independently repeating steps a–f for each receive device.

2. The method as defined in claim 1 wherein there are a plurality of receive devices.

3. The method of claim 1 wherein the total of the average bandwidths of all of the receive devices is equal to the average bandwidth T.

4. The method of claim 1 further characterized by repeating steps a–f at least one additional time for each receive device.

5. The invention as defined in claim 2 wherein data is started to be transmitted to a successive receive device prior to the conclusion of the transfer of data to the receive device being tested.

6. A storage media containing a program for dynamically testing a buffering and selection device which is configured to receive data including destination tags at a given average bandwidth T, and in a peak bandwidth greater than T as bursts, and store and output data to at least one receive device, the total average bandwidth that the receive devices can transmit data being at least as great as T, and wherein said buffering and selection device includes a buffering system apportioned to each receiving device proportional to the portion of the total average bandwidth of each of said receiving devices to the total average bandwidth of all of the receiving devices, and selection logic to store in and read from said buffering system data written to each specific receive device individually, in burst mode, said program comprising instructions for:
   a. disabling the output data flow to the receive device being tested;
   b. generating input data to said buffering and selection device tagged for each receive device successively in burst mode and at a preselected number of transfers for each receive device;
   c. determining when such preselected number of transfers of data has occurred to the receive device being tested;
   d. enabling data flow to the receive device being tested;
   e. determining if the output from each receive device has commenced within a preselected latency period;
   f. if the output from a given device has commenced within the said preselected latency period, determining if the preselected number of transfers of the data has occurred within a preselected transfer period; and
   g. independently repeating steps a–f for each receive device.

7. The program as defined in claim 6 wherein there are instructions for testing a plurality of receive devices.

8. The program of claim 6 wherein the total of the program includes instructions for testing the average bandwidths of all of the receive devices is equal to the average bandwidth T.

9. The program of claim 6 further characterized by the program having steps for repeating steps a–f at least one additional time for each receive device.

10. The program as defined in claim 7 wherein the program has steps for starting data is started to be transmitted to a successive receive device prior to the conclusion of the transfer of data to the receive device being tested.

* * * * *